(12) United States Patent
Tseng

(10) Patent No.: US 6,699,546 B2
(45) Date of Patent: Mar. 2, 2004

(54) LOW HAZE POLYESTER CONTAINERS

(75) Inventor: Jung Shung Tseng, Taipei (TW)

(73) Assignee: Nan Ya Plastics Corporation, America, Lake City, SC (US)

( * ) Notice: Subject to any disclaimer, the term of this patent is extended or adjusted under 35 U.S.C. 154(b) by 0 days.

(21) Appl. No.: 10/200,363

(22) Filed: Jul. 22, 2002

(65) Prior Publication Data

US 2004/0013832 A1 Jan. 22, 2004

(51) Int. Cl.$^7$ ................................................ B32B 1/02
(52) U.S. Cl. ........................ 428/35.7; 264/165; 264/239
(58) Field of Search ......................... 428/35.7; 264/165, 264/239

(56) References Cited

U.S. PATENT DOCUMENTS

| 4,246,378 A | 1/1981 | Kometani et al. ........... 525/438 |
| 4,444,931 A | 4/1984 | Lu et al. ..................... 524/227 |
| 4,705,844 A | 11/1987 | Espenschied et al. ....... 528/275 |
| 4,745,027 A | 5/1988 | Maeda et al. ............... 428/372 |
| 5,235,024 A | 8/1993 | Niki et al. ................... 528/190 |
| 5,298,546 A | 3/1994 | Kirsch et al. ................ 524/423 |
| 5,324,556 A | 6/1994 | Hino et al. .................. 428/35.7 |
| 5,431,972 A | 7/1995 | Richeson et al. ........ 428/36.92 |
| 5,441,997 A | 8/1995 | Walsh et al. ................. 524/147 |
| 5,523,135 A | 6/1996 | Shiwaku et al. ............ 428/35.7 |
| 5,833,905 A | 11/1998 | Miki ........................ 264/211.1 |
| 5,840,798 A | 11/1998 | Vollenberg et al. .......... 524/423 |
| 5,886,099 A | 3/1999 | Ninokura ................... 525/92 F |
| 5,997,765 A | 12/1999 | Furuta et al. ........... 252/299.01 |
| 5,997,980 A | 12/1999 | Matoba et al. ................. 428/85 |
| 6,048,626 A | 4/2000 | Tsuzuki et al. .............. 428/480 |
| 6,503,616 B1 * | 1/2003 | Jalan ............................ 428/323 |
| 2003/0113490 A1 * | 6/2003 | Jen ............................ 428/35.7 |

* cited by examiner

Primary Examiner—Sandra M. Nolan
(74) Attorney, Agent, or Firm—MacCord Mason PLLC

(57) ABSTRACT

Hot-fill polyester bottles and other containers characterized by an absence of visually discernable haze are manufactured from a polyester polymer containing up to about 250 ppm, and preferably from about 40 ppm to about 50 ppm, of a uniformly dispersed barium sulfate having an average particle size of less than about 0.1 micron. The polymer may be first formed into a preform, which may have an average wall thickness of from about 4 mm to about 6 mm, that is subsequently blown into the desired container configuration.

20 Claims, 1 Drawing Sheet

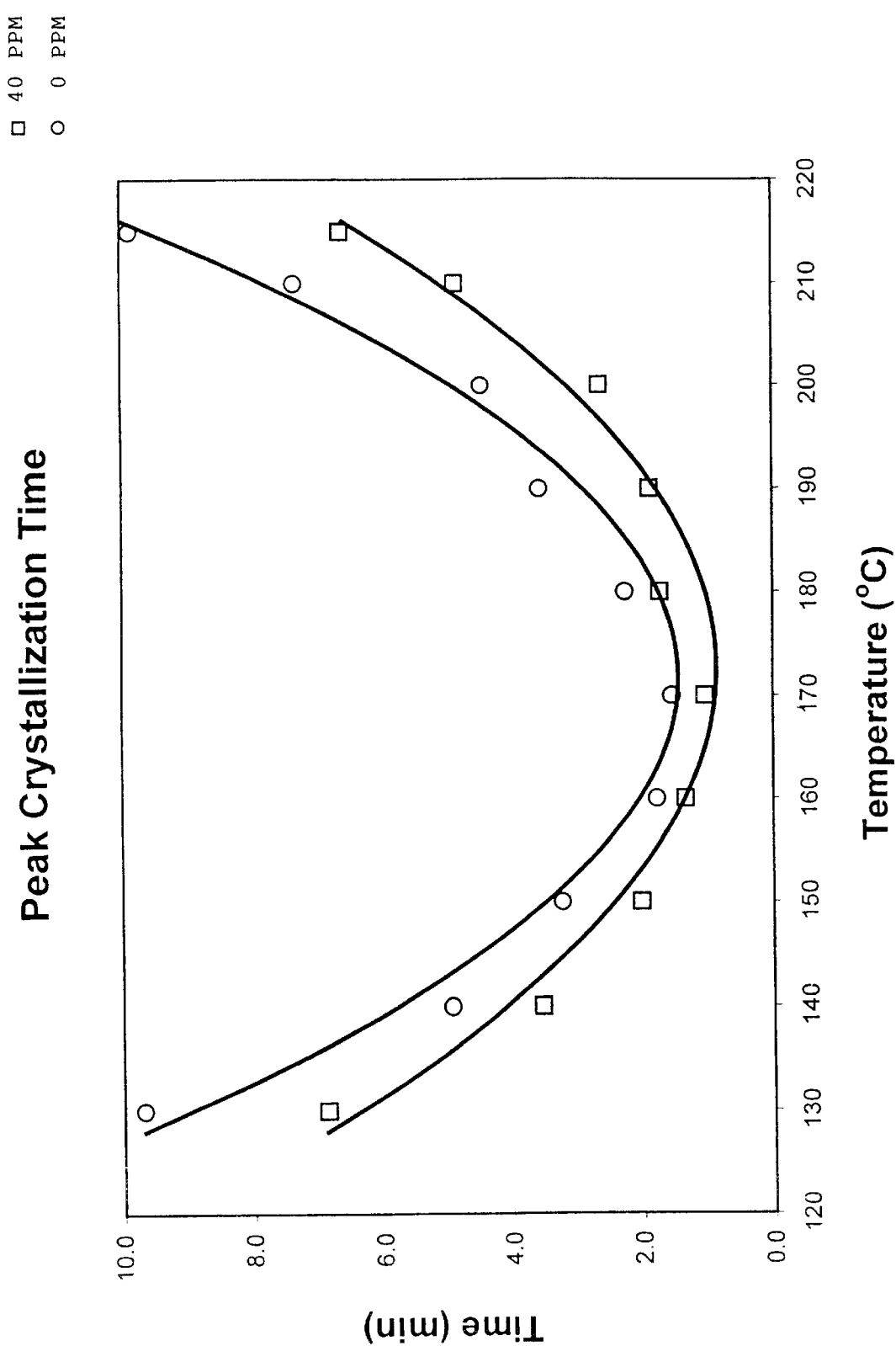

LOW HAZE POLYESTER CONTAINERS

BACKGROUND OF THE INVENTION (1) Field of the Invention

The present invention relates generally to the manufacture of polyester resins, and to preforms and hot-fill bottles and other containers manufactured therefrom.

(2) Description of the Prior Art

Polyethylene terephthalate (PET) bottles and other containers are widely used for foods and beverages because of their optical clarity, ease of blow molding, gas barrier properties, heat resistance, mechanical strength, and price. To form the resin into containers, the polyester resin is typically first shaped by injection molding into a thick-walled preform, typically in the shape of a tube with a threaded opening, or finish end, at the top. A container is then produced by stretch blow molding the heated preform in a mold having a cavity of the desired container shape. The preform is expanded to fill the mold by rapidly stretching it mechanically in the axial direction while simultaneously forcing air into the heated preform to expand it radially. The resultant containers are acceptable for use in packaging liquids that have a fill temperature at about room temperature.

However, filling of such containers with liquid that is at an elevated temperature, usually as a result of pasteurization or sterilization, tends to soften the container, causing shrinkage and distortion. Accordingly, an additional annealing step is required to heat treat or heat-set containers used in the packaging of heated liquids. Heat setting is normally effected by briefly annealing the container in a heated mold, which may be the same or different from the mold used during the blow-molding step.

For example, hot fill containers may be formed using a heat-setting mold having a temperature of 110° C. to 170° C., preferably from about 130° C. to 150° C. A preform is first heated to above its softening temperature, and inserted into the mold. Air is then blown into the interior of the preform with an inserted rod as the preform is elongated. Normally, the air is blown in two stages, a primary or pre-blow stage in which the preform is expanded to the general shape of the container, followed by a secondary or high blow stage at an increased force to ensure that the preform conforms to the interior dimensions of the heated mold. In this secondary stage, the fully expanded container is held against the wall of the heated mold for a brief period, e.g., 0.5 to 0.8 second, so that the polyester undergoes some degree of crystallization, which increases the resin's thermal stability and reduces the tendency of the container to shrink or distort. Heat setting permits filling of the containers with liquids having a temperature of up to about 100° C. without significant shrinkage or distortion.

However, this additional annealing or heat-setting step significantly lengthens the time required to make a container, resulting in reduced productivity and higher costs. Thus, to meet the demands for high-speed production, it is necessary to use a polyester resin that has an increased rate of crystallization. Rapid crystallization of polyester resins, however, tends to result in preforms and containers that have a hazy or cloudy appearance, rendering the containers aesthetically unacceptable for the packaging of liquids for human consumption.

Thus, there is a continuing need for a method of increasing the crystallization rate of polyester resins enabling the rapid production of hot-fill bottles with an acceptable optical clarity. There is similarly a need for a polyester resin suitable to achieve this objective, and for preforms and hot-fill polyester containers exhibiting these properties.

DESCRIPTION OF THE DRAWING

The sole FIGURE is a graph comparing the peak crystallization times of the materials described in Example 1 at different temperatures as determined by differential scanning colorimetry.

SUMMARY OF THE INVENTION

Commonly assigned U.S. patent application Ser. No. 10/017,420, filed Dec. 13, 2001, describes the production of polyester bottles from polyester resin that has incorporated therein from about 0.001 wt. % (10 ppm) to about 0.1 wt. % (1000 ppm), and preferably from about 0.005 wt. % (50 ppm) to about 0.05 wt. % (500 ppm), of $BaSO_4$ having an average particle size of from 0.1 micron to 2.0 micron, and preferably from about 0.2 micron to about 1.0 micron. Incorporation of $BaSO_4$ of this particle size in this quantity has been found to significantly reduce bottle-to-bottle friction, i.e., the sticking of polyester bottles to each other as they move along a conveyor, resulting in improved production efficiencies. This reduction in bottle-to-bottle friction is due to the increased roughness from the presence of these larger size particles of $BaSO_4$ adjacent the bottle surface.

In accordance with the present invention, it has been found that a different and unrelated advantage, namely an increase in crystallization without a noticeable increase in haziness, can be achieved by incorporating a different amount of $BaSO_4$ with a different average particle size into the polyester resins.

More specifically, it has been found that the crystallization rate, and thereby the production rate, of hot-fill polyester bottles and other containers can be increased without causing visually discernable haze in the bottles, by incorporating up to about 250 ppm, and preferable from about 40 ppm to about 50 ppm, of $BaSO_4$ having an average particle size of less than 0.1 micron into the polyester resin used in manufacture of the containers.

It will be understood by one skilled in the relevant art that many factors affect formation of visually discernable haze in the manufacture of polyester containers, the preform wall thickness being a factor of primary significance. For example, under the same conditions, a preform wall thickness of about 4 mm may not exhibit visually discernable haze, while a preform of an otherwise identical composition manufactured under the same conditions may exhibit visually discernable haze when the wall thickness is about 6 mm. Presence of haze in the preform will necessarily result in haze in a container made from the preform. Thus, when determining the desired amount of $BaSO_4$ to use in a given polyester composition, one skilled in the art will take into account the wall thickness of the preform. Accordingly, a container with a thinner wall, e.g., a 4 mm wall, may contain up to 250 ppm $BaSO_4$, while containers with a 6 mm wall may be limited to no more than 40–50 ppm $BaSO_4$ in the composition.

Other factors to be taken into account in determining the amount of $BaSO_4$ to use in the composition include the conditions used in molding the preform, as well as the container design, and the conditions under which the container is manufactured, in particular the amount of time that the container is annealed. For example, if a container with greater resistance to shrinkage and distortion is required, the manufacturer may prolong the annealing time, which will improve these properties by increasing the percentage of crystallization. However, the likelihood of an increase in haziness is proportional to the increase in crystallization. Therefore, a lesser amount of $BaSO_4$ may be needed if a greater annealing time is employed.

The present invention is generally useful with the various polyester polymers normally used on the manufacture of clear bottles, such as beverage containers having a volume of, e.g., 8 to 12 oz. up to about 1 to 2 liters, or more. Polyester compositions are generally prepared by the esterification of a diacid and a diol, and may also be prepared by the transesterification of a diester, such as dimethyl terephthalate, and a diol, followed by polycondensation. Transesterification catalysts such as the acetates of zinc, manganese, cobalt, sodium and calcium can be employed individually or in combination, while polycondensation catalysts include antimony compounds (such as antimony acetate, antimony oxides), germanium compounds, and titanium compounds. The commonly used diacid is terephthalic acid, while the normal diol is ethylene glycol. Copolyesters can be formed with the two or more diacids or diols. Representative examples of substitute diacid components are isophthalic acid, adipic acid, 2,6-naphthalene dicarboxylic acid, etc. A substitute diester is dimethyl 2,6-naphthalene dicarboxylate. Representative examples of substitute diol components are diethylene glycol, 1,4-butanediol, cyclohexanedimethanol, 1,3-propandiol, etc. The specific reaction conditions for polyester production are well known in the art and are not per se a part of the present invention.

These polyester compositions used for bottles are normally produced by melt phase polymerization, followed by solid-state polymerization. Generally speaking, after the melt phase polymerization, the intrinsic viscosity (I.V.) reaches a level of about 0.5 to 0.7. Higher I.V. levels are not practically achievable by melt phase polymerization without degradation of the polymer. In order to raise the I.V. to the level normally used for bottles, the melt phase product is first pelletized and the temperature is lowered to room temperature. The pellets are then further polymerized by solid-state polymerization by heating with a nitrogen blanket at about 200° C. to increase the I.V. to 0.7 to 1.1, preferably 0.72 to 0.88.

The polyester compositions used to prepare the preforms and bottles of the present invention are preferably prepared by incorporating the $BaSO_4$ during the melt phase. A slurry may be formed of $BaSO_4$ and ethylene glycol, and milled to ensure a uniform dispersion of $BaSO_4$/ethylene glycol without any agglomeration. Preferably, the $BaSO_4$ should not exceed 75% by wt. of the slurry. This slurry is added into the melt phase polymerization process, preferably at the esterification stage. An amount of slurry sufficient to achieve the desired percentage of $BaSO_4$ is used. Alternatively, the $BaSO_4$ can be added into the TA/EG slurry, added directly to the polymer melt at the end of the polycondensation process, added into the extruder during the injection molding of the preform, or made into a master batch of $BaSO_4$ and PET via a compounding process, and then adding the master batch to the extruder.

In selecting the appropriate size and quantity of $BaSO_4$, an average particle size of 0.1 micron and above should be avoided, since it has been found that only particle sizes below 0.1 micron have a significant nucleation effect in the polyester, and therefore the desired increase in crystallization rate. Further, unlike the invention described in the above co-pending application in which the features are attributable to the physical characteristics of the $BaSO_4$, permitting the addition of up to 1000 ppm $BaSO_4$, the upper limit of $BaSO_4$ used in the present polyester resins should not exceed about 250 ppm in order to avoid noticeable haziness with these smaller diameter particles.

In the preferred embodiment, the polyester/$BaSO_4$ compositions are first formed into hollow preforms by injection molding. The preform is generally in the form of a closed end cylinder with a closed end and an open threaded, or finish, end, with a volume equal to about 1/15th to about 1/30th of the volume of the final bottle. The preforms, after cooling, are normally conveyed or shipped to another location, where they are heated to 90–140° C., normally by infrared lamps, and biaxially stretched, e.g., by blow molding, to the shape of the final bottle.

The $BaSO_4$-containing polymers can be used to manufacture a variety of bottle shapes, and the actual bottle shape is not a critical feature of the invention, although as noted previously the bottle shape is relevant in determining the amount of $BaSO_4$ used. Examples of hot-fill containers contemplated by the present invention are bottles used in the packaging of juices and sauces.

Various additives commonly used in clear polyester bottles can also be used in the polyester compositions, so long as haziness does not result. Such optional additives include thermal stabilizers, light stabilizers, dyes, pigments, plasticizers, antioxidants, lubricants, effusion aids, residual monomer scavengers, and the like.

DETAILED DESCRIPTION OF THE INVENTION

EXAMPLE I

The effect on crystallization of polyester resin of a small amount (40 ppm) of $BaSO_4$ having an average particle size of less than 0.1 micron is shown by the following comparison with the same polyester resin without added $BaSO_4$:

TABLE 1

|  | 40 ppm | 0 ppm |
|---|---|---|
| IV (dl/g) | 0.781 | 0.799 |
| L-value (−) | 79 | 80 |
| b-value (−) | −3.6 | −3.3 |
| Tg (° C.) | 82.2 | 82.4 |
| Cp (J/g) | 0.32 | 0.31 |
| Tc (° C.) | 181.2 | 188.7 |
| Hc (J/g) | 30 | 18.7 |
| Tm (° C.) | 252.2 | 250.7 |
| Hm (J/g) | 27.2 | 19.8 |
| Tcc (° C.) | 155.5 | 155.1 |
| Hcc (J/g) | 14.3 | 5.1 |

In the above table: IV=intrinsic viscosity; L-value= whiteness index; b-value=yellowness index; Tg=glass transition temperature; Cp=heat capacity; Tc=crystallization peak temperature during heating; Hc=crystallization energy during heating; Tm=melting temperature; Hm=energy absorbed during melting; Tcc=crystallization peak temperature of cooling curve; and Hcc=crystallization energy released during cooling. The higher crystallization rate of the resin containing 40 ppm $BaSO_4$ is shown by the lower Tc, and the higher Tcc, Hc and Hcc.

EXAMPLE II

Samples of polyester resin containing 100 ppm BaSO4 (Sample A) and 50 ppm BaSO4 (Sample B) were first dried at 300° F. for about 5–6 hours, and then formed into 1-liter heat-set bottle preforms having a weight of 49 g and a finish opening diameter of 43 mm. The haziness of Sample A, particularly in the thickest part of the preform (5.3 mm), was determined to be unacceptable for bottle production due to visually discernable haze. It is believed that the haziness is caused by too much crystallization. Sample B at the same wall thickness and produced under the same conditions, was determined to have acceptable clarity. Sample B was then blown into 1-liter bottles that were evaluated by testing for shrinkage and ovality. The degree of shrinkage determines any changes in diameter, height and volume. Ovality indicates how the bottle retains its round shape after hot filling. By industry standards, an acceptable hot-filled bottle has shrinkage of less than about 3.0% and a change in ovality of less than about 0.100 inch.

The following shrinkage percentages were observed as different sections along the bottle when the bottles were filled with liquid at the specified temperatures (average of 10 measurements):

TABLE 3

| Position | 185° F. | 190° F. | 195° F. | 200° F. |
|---|---|---|---|---|
| Height | 0.10 | 0.21 | 0.37 | 0.40 |
| Upper Bell | 1.23 | 1.67 | 1.95 | 2.52 |
| Lower Bell | 1.66 | 2.42 | 3.06 | 4.28 |
| Upper Bumper | 1.10 | 1.63 | 2.10 | 3.04 |
| Lower Bumper | 1.54 | 2.29 | 2.91 | 4.07 |
| Volume | 1.42 | 2.00 | 2.47 | 3.57 |

The following changes in ovality (inch) were noted along the bottle length at the specified temperatures (average of 10 measurements):

TABLE 4

| Position | 185° F. | 190° F. | 195° F. | 200° F. |
|---|---|---|---|---|
| Upper Bell | 0.022 | 0.021 | 0.027 | 0.028 |
| Lower Bell | 0.020 | 0.019 | 0.023 | 0.031 |
| Upper Bumper | 0.018 | 0.025 | 0.027 | 0.037 |
| Lower Bumper | 0.011 | 0.011 | 0.014 | 0.029 |

The bottles were also top-load tested. Empty bottles were tested to simulate loading that the bottles might experience during filling. Filled bottle testing to simulate loading that the bottles might experience when stacked. As indicated by the following table, the bottles had a maximum top load of 66.6 lbs. at 0.16 in. displacement, and a filled top load of 81.3 lbs. These values compare favorably with acceptable industry values:

TABLE 5

| Test No. | Displacement at Max. Load (in.) | | Load at Max. Load (lbf) | |
|---|---|---|---|---|
| | Empty Bottle | Hot-Filled Bottle | Empty Bottle | Hot-Filled Bottle |
| 1 | 0.155 | 0.240 | 66.52 | 80.75 |
| 2 | 0.171 | 0.282 | 70.63 | 83.89 |
| 3 | 0.162 | 0.261 | 63.49 | 81.15 |
| 4 | 0.166 | 0.295 | 69.58 | 83.68 |
| 5 | 0.156 | 0.235 | 64.48 | 75.03 |
| 6 | 0.158 | 0.266 | 64.70 | 83.52 |
| Avg. | 0.161 | 0.263 | 66.57 | 81.34 |

EXAMPLE III

Polyester resin with 40 ppm BaSO4 was air dried at 160° C. for 4 hours, and then formed into 60.75 g preforms of acceptable clarity at injection temperatures in the range of 265° C. to 290° C. Preforms formed by injection molding at 280° C. were stretch blow molded into 1.5L bottles on a Krupp Corpoplast LB01E stretch blow-molding machine. It was determined that bottles with acceptable clarity, shrinkage and deformation could be produced within the preform skin temperature range of from 99° C. to 119° C., with the optimal temperature being 117° C. Shrinkage and deformation was measured after filling the bottles with water at 88° C. Bottle shrinkage was determined to be 2.47%, while change in ovality was 0.035% at the diameter of the lower bell.

EXAMPLE IV

Polyester resin samples containing 0 ppm, 250 ppm and 500 ppm of $BaSO_4$ were formed into 48 g preforms having an average wall thickness of 0.16 in. (4.06 mm). Cooling times of 4, 7 and 11 seconds, and extrusion temperature of 515° F., 535° F. and 560° F., were used to test the processability of the different resins. Bottles were produced from the preforms on a Cincinnati Milacron RHB-L laboratory blow molder, equipped with a 1.5 liter bottle mold. The molder was also equipped with a Milacron Spectrawave oven utilizing 650-watt quartz lamps.

During the tests, the primary blow pressure was set at 140 psi and the secondary blow pressure was set at 420 psi. After being heated by the infrared lamps, the equilibrium time before blowing was set for 10 seconds. The primary delay time was set at 0.5 second. The skin temperature of the preform was controlled by adjusting the oven residence time within the range of 130 to 260 seconds. The properties of the resultant preforms and bottles are set forth in the following tables.

TABLE 6

| 0 ppm | Cond. 1 | Cond. 2 | Cond. 3 | Cond. 4 | Cond. 5 |
|---|---|---|---|---|---|
| Extruder Temp (F.) | 560 | 560 | 560 | 530 | 515 |
| Nozzle Temp (C.) | 280 | 280 | 280 | 280 | 260 |
| Cooling Water Temp (F.) | 50 | 50 | 50 | 50 | 50 |
| Cooling Time (sec) | 11 | 7 | 4 | 11 | 11 |
| Preform | Clear | Clear | Clear | Hazy (light) | Hazy (heavy) |
| Bottle (various heating times) (sec) | | | | | |
| 260 | Hazy (light) | | | | |
| 240 | Clear | Clear | Clear | Hazy (light) | Pearl (heavy) |
| 220 | Clear | Clear | Clear | Clear | Pearl (moderate) |
| 200 | Clear | Clear | Clear | Clear | Pearl (moderate) |
| 180 | Clear | | | | |
| 170 | Clear side Pearl bottom | | | | |
| 160 | Bottle failed | | | | |

TABLE 7

| 250 ppm | Cond. 1 | Cond. 2 | Cond. 3 | Cond. 4 | Cond. 5 |
|---|---|---|---|---|---|
| Extruder Temp (F.) | 560 | 560 | 560 | 530 | 515 |
| Nozzle Temp (C.) | 280 | 280 | 280 | 280 | 260 |

TABLE 7-continued

| 250 ppm | Cond. 1 | Cond. 2 | Cond. 3 | Cond. 4 | Cond. 5 |
|---|---|---|---|---|---|
| Cooling Water Temp (F.) | 50 | 50 | 50 | 50 | 50 |
| Cooling Time (sec) | 11 | 7 | 4 | 11 | 11 |
| Preform | Clear | Clear | Clear then hazy | Clear | Hazy (heavy) |
| Bottle (various heating times (sec) | | | | | |
| 240 | Hazy (moderate) | Hazy (heavy) | Hazy (heavy) | Hazy (heavy) | Pearl (failure) |
| 220 | Clear | Clear | Clear | Hazy (light) | Pearl (heavy) |
| 200 | Clear | Clear | Clear | Clear | Pearl (moderate) |
| 180 | Clear | | | | |
| 160 | Clear | | | | |
| 140 | Pearl (light) | | | | |
| 130 | Bottle failed | | | | |

TABLE 8

| 500 ppm | Cond. 1 | Cond. 2 | Cond. 3 | Cond. 4 | Cond. 5 |
|---|---|---|---|---|---|
| Extruder Temp (F.) | 560 | 560 | 560 | 530 | 515 |
| Nozzle Temp (C.) | 280 | 280 | 280 | 280 | 260 |
| Cooling Water Temp (F.) | 50 | 50 | 50 | 50 | 50 |
| Cooling Time (sec) | 11 | 7 | 4 | 11 | 11 |
| Preform | Clear | Hazy (light) | Hazy (moderate) | Hazy (light) | Hazy (heavy) |
| Bottle (various heating times) (sec) | | | | | |
| 240 | Hazy (heavy) | | | Hazy (heavy) | Hazy (heavy) |
| 220 | Hazy (light) | | | Hazy (moderate) | Hazy (moderate) |
| 200 | Clear | | | Hazy (light) | Hazy (light) |
| 180 | Clear | | | | |
| 160 | Clear | | | | |
| 150 | Pearl (light) | | | | |
| 140 | Bottle failed | | | | |

The above data demonstrates that factors such as extruder temperature, nozzle temperature, and cooling time have a significant affect on the properties of the preforms and bottles, even when the same resin is used to produce a bottle preform having the same wall thickness. Based on the above data, it is concluded that up to about 250 ppm of $BaSO_4$ may be successfully used in hot fill polyester bottle resins, with a sufficient operating window for commercial feasibility, when producing bottles from preforms having an average wall thickness of about 4 mm.

Certain modificaitons and improvements will occur to those skilled in the art upon a reading of the foregoing description. It should be understood that all such modifications and improvements have been deleted herein for the sake of conciseness and readability but are properly within the scope of the following claims.

What is claimed is:

1. An injection molded polyester container preform characterized by an absence of visually discernable haze, said preform being comprised of a polyester polymer containing up to about 250 ppm of barium sulfate having an average particle size of less than about 0.1 micron.

2. The container preform of claim 1, wherein said polyester polymer is selected from polyethylene terephthalate and modified polyethylene terephthalate.

3. The container preform of claim 1, wherein said polymer contains up to about 50 ppm barium sulfate having an average particle size of less than about 0.1 micron.

4. The container preform of claim 1, wherein said polymer contains from about 40 ppm to about 50 ppm of barium sulfate having an average particle size of less than about 0.1 micron.

5. The container preform of claim 1, having an average wall thickness of from about 4 mm to about 6 mm.

6. A polyester container comprised of a polyester polymer containing up to 250 ppm barium sulfate having an average particle size of less than about 0.1 microns to increase the rate of crystallization, said container being characterized by an absence of visually discernable haze.

7. The container of claim 6, wherein said polyester polymer is selected from polyethylene terephthalate and modified polyethylene terephthalate.

8. The container of claim 6, wherein said polymer contains up to about 50 ppm barium sulfate having an average particle size of less than about 0.1 micron.

9. The container of claim 6, wherein said polymer contains from about 40 ppm to about 50 ppm of barium sulfate having an average particle size of less than about 0.1 micron.

10. The container of claim 6, wherein said container is a beverage bottle having a capacity of from about 8 ounces to about 2 liters.

11. A polyester polymer having uniformly dispersed therein up to 250 ppm of barium sulfate having an average particle size of less than 0.1 micron.

12. The polymer of claim 11, wherein said polyester polymer is selected from polyethylene terephthalate and modified polyethylene terephthalate.

13. The polymer of claim 11, wherein said polymer contains up to about 50 ppm of barium sulfate having an average particle size of less than about 0.1 micron.

14. The polymer of claim 12, having an I.V. of about 0.7 to about 1.1.

15. A method for making hot-fill polyester containers characterized by an absence of visually discernable haze comprising:
    a) providing a polyester polymer containing up to about 250 ppm of barium sulfate having an average particle size of less than about 0.1 micron;
    b) forming a container from said polymer; and
    c) heating said container to partially crystallize said polymer.

16. The method of claim 15, wherein said polyester polymer is selected from polyethylene terephthalate and modified polyethylene terephthalate.

17. The method of claim 15, wherein said polymer contains up to about 50 ppm of barium sulfate having an average particle size of less than about 0.1 micron.

18. The method of claim 15, further including the step of forming a preform from said polymer, said container being formed by stretch blow molding of said preform.

19. The method of claim 15, wherein said polymer is injection molded into a preform having an absence of visually discernable haze, and said preform is heated to a skin temperature of from about 100° C. to about 130° C. and formed into a bottle by stretch blow molding.

20. The method of claim 15, wherein said polymer is injection molded into a preform having an absence of visually discernable haze having an average wall thickness of from about 4 mm to about 6 mm.

* * * * *